US012742905B2

(12) United States Patent
Gail et al.

(10) Patent No.: US 12,742,905 B2
(45) Date of Patent: Sep. 22, 2026

(54) OPTIMIZING A PROBABILITY OF PRECIPITATION FORECAST

(71) Applicant: Google LLC, Mountain View, CA (US)

(72) Inventors: William B. Gail, Boulder, CO (US); Brett Basarab, Longmont, CO (US); William Myers, Boulder, CO (US)

(73) Assignee: Google LLC, Mountain View, CA (US)

( * ) Notice: Subject to any disclaimer, the term of this patent is extended or adjusted under 35 U.S.C. 154(b) by 394 days.

(21) Appl. No.: 18/564,961

(22) PCT Filed: May 28, 2021

(86) PCT No.: PCT/US2021/034757

§ 371 (c)(1),
(2) Date: Nov. 28, 2023

(87) PCT Pub. No.: WO2022/250686

PCT Pub. Date: Dec. 1, 2022

(65) Prior Publication Data

US 2024/0184013 A1 Jun. 6, 2024

(51) Int. Cl.

*G01W 1/10* (2006.01)
*G01W 1/14* (2006.01)
*G01W 1/18* (2006.01)

(52) U.S. Cl.

CPC ................ *G01W 1/10* (2013.01); *G01W 1/14* (2013.01); *G01W 1/18* (2013.01)

(58) Field of Classification Search

CPC ........... G01W 1/10; G01W 1/14; G01W 1/18; G01W 2201/00

See application file for complete search history.

(56) References Cited

U.S. PATENT DOCUMENTS 10,197,706 B1 2/2019 Cai et al.
12,443,739 B2 * 10/2025 Mohammed ........ G06F 21/6218
(Continued)

FOREIGN PATENT DOCUMENTS

JP H05060879 A 3/1993
JP 2010060444 A 3/2010
(Continued)

OTHER PUBLICATIONS

International Search Report and Written Opinion for PCT Application No. PCT/US2021/034757, mailed on Feb. 16, 2022, 11 pages.
(Continued)

*Primary Examiner* — Thien M Le
(74) *Attorney, Agent, or Firm* — Brake Hughes Bellermann LLP

(57) ABSTRACT

A method of optimizing a probability of precipitation forecast is provided. The method includes uniquely associating, based on a data segment definition, a spatiotemporal subregion with a probability of precipitation forecasting algorithm of two or more probability of precipitation forecasting algorithms. The method further includes selecting climatological data meeting the data segment definition and calibrating, using the selected climatological data meeting the data segment definition, the probability of precipitation forecasting algorithm associated with the spatiotemporal subregion.

22 Claims, 6 Drawing Sheets

(56) References Cited

U.S. PATENT DOCUMENTS

| | | | | |
|---|---|---|---|---|
| 12,554,874 | B2 * | 2/2026 | Mohammed | G06F 21/6218 |
| 2014/0350856 | A1 | 11/2014 | Lambie et al. | |
| 2015/0198452 | A1 * | 7/2015 | Gupta | G01C 21/3691 701/533 |
| 2016/0299255 | A1 | 10/2016 | Dail et al. | |
| 2019/0018918 | A1 | 1/2019 | Wood et al. | |
| 2020/0309994 | A1 | 10/2020 | Eckel et al. | |
| 2020/0398959 | A1 * | 12/2020 | Pomerantz | H04B 7/155 |
| 2021/0129078 | A1 * | 5/2021 | Regan | B63H 21/00 |
| 2023/0250495 | A1 * | 8/2023 | Osborn | C12Q 1/6844 435/5 |
| 2023/0364554 | A1 * | 11/2023 | Romaniello | C02F 1/20 |
| 2024/0054513 | A1 * | 2/2024 | Ma | G06Q 30/0201 |
| 2024/0061977 | A1 * | 2/2024 | Ling | G01V 20/00 |
| 2024/0354851 | A1 * | 10/2024 | Stolt | G06Q 50/02 |

FOREIGN PATENT DOCUMENTS

| | | | |
|---|---|---|---|
| JP | 2010243483 | A | 10/2010 |
| JP | 2020106406 | A | 7/2020 |
| WO | 2018043252 | A1 | 3/2018 |
| WO | 2021080107 | A1 | 4/2021 |

OTHER PUBLICATIONS

Office Action for Japanese Application No. 2023-573220 (with English translation), mailed Nov. 12, 2024, 13 pages.
First Office Action for Chinese Application No. 202180098757.7 (with English translation), dated Mar. 19, 2026, 16 pages.

* cited by examiner

400

410 Data Segment Definition 420

| Precipitation threshold | “greater than 85%” |
|---|---|
| Seasonal attribute | “summertime” |
| third DSD parameter | third DSD value |
| fourth DSD parameter | fourth DSD value |
| ⋮ | ⋮ |

| 620a | 620b | 620c | 620d |
|---|---|---|---|
| QPF-based FA | first data segment definition | first skill value | first reliability value |
| Ensemble-based FA | first data segment definition | second skill value | second reliability value |
| POPFA 3 | first data segment definition | third skill value | third reliability value |
| QPF-based FA | second data segment definition | fourth skill value | fourth reliability value |
| Ensemble-based FA | second data segment definition | fifth skill value | fifth reliability value |
| POPFA 3 | second data segment definition | sixth skill value | sixth reliability value |
| QPF-based FA | third data segment definition | seventh skill value | seventh reliability value |
| Ensemble-based FA | third data segment definition | eighth skill value | eighth reliability value |
| ⋮ | ⋮ | ⋮ | ⋮ |

FIG. 6

OPTIMIZING A PROBABILITY OF PRECIPITATION FORECAST

CROSS-REFERENCE TO RELATED APPLICATION

This application is a 35 U.S.C. § 371 National Phase Entry Application from PCT/US2021/034757, filed on May 28, 2021, entitled "OPTIMIZING A PROBABILITY OF PRECIPITATION FORECAST", the disclosure of which is incorporated herein by reference in its entirety.

TECHNICAL FIELD

The embodiments described below relate to weather information and, more particularly, to optimizing a probability of precipitation forecast.

BACKGROUND

Probability of precipitation (sometimes referred to as "POP") is a widely used standard metric in weather forecasts. Phrases such as "60% chance of rain tomorrow" are recognized by the public. Generally speaking, the probability of precipitation is a predication that precipitation will occur in a given spatiotemporal subregion in a region. The probability of precipitation may be determined for a forecast period or timeframe, such as "today", "next evening," "next hour", or the like, of a spatial region. Accordingly, the probability of precipitation may be determined for a spatiotemporal subregion that is defined by a timeframe and a spatial region, such as from "7:00 pm to 8:00 pm at airport A."

A variety of methodologies are available for generating probability of precipitation forecasts. In one methodology, an ensemble numerical weather prediction (NWP) model forecast is used to generate probability of precipitation forecast values, which may be referred to as an ensemble-based probability of precipitation forecasting algorithm. Such ensembles typically consist of multiple equivalent forecasts, which may be referred to as ensemble members, for a forecast region. Each ensemble member is usually generated with slightly different model initial conditions, in an effort to reflect the range of possible outcomes the model could produce. Properly calibrated, the ensemble members have equal likelihood of occurrence. If 95 of 100 ensemble members predict rain, for example, it can be concluded that the POP forecast value is 95%. In another methodology, the quantitative precipitation forecast (QPF) is used to generate probability of precipitation forecast values. In simple terms, lower QPF values are assigned lower probability of precipitation forecast values. The methodology can be calibrated so that, for example, a probability of precipitation forecast value of 60% corresponds well to observations showing that precipitation occurs 60% of the time that such probability of precipitation forecasts are made. Other methodologies are possible as well.

Each methodology has its strengths and weaknesses. For example, a QPF methodology, such as a QPF-based POP forecasting algorithm, can be applied using only information from a deterministic numerical weather prediction (NWP), which tend to have higher spatial and temporal resolution than ensemble NWPs. The QPF-based POP forecasting algorithm thus offers the possibility of better skill associated with discriminating among events having higher spatial and temporal resolution, such as convective regimes like thunderstorms. The ensemble methodology, on the other hand, is better suited to proper prediction of low amount, high probability precipitation rain such as is common in locations like Seattle. Accordingly, there is a need for optimizing a probability of precipitation forecast.

SUMMARY

A method of optimizing a probability of precipitation forecast is provided. According to an embodiment, the method comprises uniquely associating, based on a data segment definition, a spatiotemporal subregion with a probability of precipitation forecasting algorithm of two or more probability of precipitation forecasting algorithms, selecting climatological data meeting the data segment definition, and calibrating, using the selected climatological data meeting the data segment definition, the probability of precipitation forecasting algorithm associated with the spatiotemporal subregion.

A system for optimizing a probability of precipitation forecast is provided. According to an embodiment, the system comprises a storage system configured to store two or more probability of precipitation forecasting algorithms for a region including a spatiotemporal subregion and a data segment definition, and a processing system communicatively coupled to the storage system, the processing system being configured to perform the above method steps.

A method for optimizing a probability of precipitation forecast is provided. According to an embodiment, the method comprises selecting a data segment definition, selecting a probability of precipitation forecasting algorithm, calibrating, using climatological data meeting the data segment definition, the probability of precipitation forecasting algorithm, determining a skill value and a reliability value of the selected and calibrated probability of precipitation forecasting algorithm, and associating the skill value and the reliability value of the selected and calibrated probability of precipitation forecasting algorithm with a combination of the selected probability of precipitation forecasting algorithm and the selected data segment definition.

A system for optimizing a probability of precipitation forecasting algorithm is provided. According to an embodiment, the system comprises a storage system configured to store two or more probability of precipitation forecasting algorithms for a region including a spatiotemporal subregion and a data segment definition, and a processing system communicatively coupled to the storage system, the processing system being configured to perform the above method steps.

ASPECTS

According to an aspect, a method of optimizing a probability of precipitation forecast comprises uniquely associating, based on a data segment definition, a spatiotemporal subregion with a probability of precipitation forecasting algorithm of two or more probability of precipitation forecasting algorithms, selecting climatological data meeting the data segment definition, and calibrating, using the selected climatological data meeting the data segment definition, the probability of precipitation forecasting algorithm associated with the spatiotemporal subregion.

Preferably, the two or more probability of precipitation forecasting algorithms are associated with a region including the spatiotemporal subregion.

Preferably, uniquely associating, based on the data segment definition, the spatiotemporal subregion with the probability of precipitation forecasting algorithm comprises determining if an initial probability of precipitation forecast value from one of the two or more probability of precipitation forecasting algorithms meets the data segment definition.

Preferably, the selected climatological data comprises one or more historical precipitation values associated with a spatial region of the spatiotemporal subregion.

Preferably, the one or more historical precipitation values associated with the spatial region of the spatiotemporal subregion and a seasonal attribute of the selected climatological data meet the data segment definition.

Preferably, the data segment definition comprises at least a precipitation threshold and a seasonal attribute.

Preferably, further comprising using the calibrated probability of precipitation forecasting algorithm to generate a probability of precipitation forecast value for the spatiotemporal subregion and providing the probability of precipitation forecast value.

According to an aspect, a system for optimizing a probability of precipitation forecast comprises a storage system configured to store two or more probability of precipitation forecasting algorithms for a region including a spatiotemporal subregion and a data segment definition, and a processing system communicatively coupled to the storage system, the processing system being configured to perform the above method steps.

According to an aspect, a method for optimizing a probability of precipitation forecast comprises selecting a data segment definition, selecting a probability of precipitation forecasting algorithm, calibrating, using climatological data meeting the data segment definition, the probability of precipitation forecasting algorithm, determining a skill value and a reliability value of the selected and calibrated probability of precipitation forecasting algorithm, and associating the skill value and the reliability value of the selected and calibrated probability of precipitation forecasting algorithm with a combination of the selected probability of precipitation forecasting algorithm and the selected data segment definition.

Preferably, further comprising iteratively performing the steps of claim 15 to respectively associate the skill values and the reliability values of a plurality of the selected and calibrated probability of precipitation forecasting algorithms with a plurality of the combinations of the selected probability of precipitation forecasting algorithm and the selected data segment definition.

Preferably, further comprising determining, based on the skill and the reliability of the selected and calibrated probability of precipitation forecasting algorithm, an optimized combination of the selected probability of precipitation forecasting algorithm and the data segment definition.

Preferably, further comprising storing the association between the skill value and the reliability value of the selected and calibrated probability of precipitation forecasting algorithm and the combination of the selected probability of precipitation forecasting algorithm and the data segment definition.

Preferably, associating the skill value and the reliability value with the combination of the selected probability of precipitation forecasting algorithm and the selected data segment definition comprises associating an aggregation of the skill value and the reliability value with the combination of the selected probability of precipitation forecasting algorithm and the selected data segment definition.

According to an aspect, a system for optimizing a probability of precipitation forecasting algorithm comprises a storage system configured to store two or more probability of precipitation forecasting algorithms for a region including a spatiotemporal subregion and a data segment definition, and a processing system communicatively coupled to the storage system, the processing system being configured to perform the above method steps.

BRIEF DESCRIPTION OF THE DRAWINGS

The same reference number represents the same element on all drawings. It should be understood that the drawings are not necessarily to scale.

FIG. 4 shows a data segment definition 400 for optimizing a probability of precipitation forecast.

FIG. 6 shows a table 600 of associations between a skill and a reliability of the selected and calibrated probability of forecasting algorithm and a combination of the selected probability of precipitation forecasting algorithm and the selected data segment definition.

DETAILED DESCRIPTION

FIGS. 1-6 and the following description depict specific examples to teach those skilled in the art how to make and use the best mode of embodiments of optimizing a probability of precipitation forecast. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of optimizing the probability of precipitation forecast. As a result, the embodiments described below are not limited to the specific examples described below, but only by the claims and their equivalents.

Figure 1:
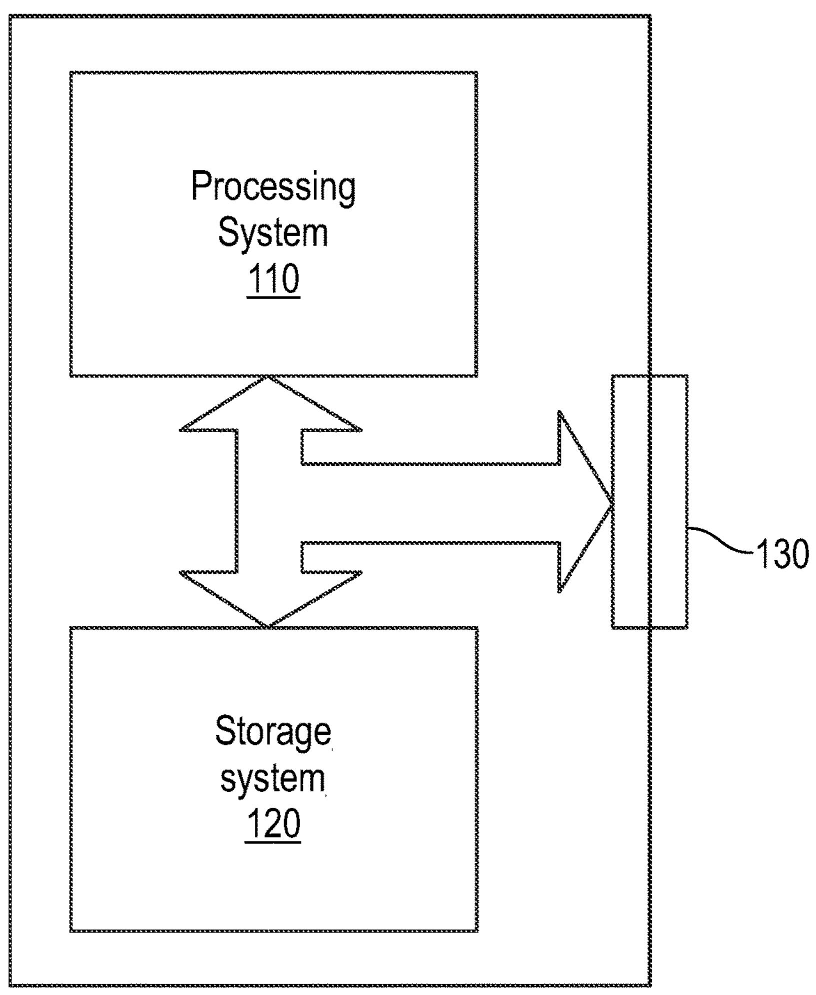
FIG. 1 shows a system 100 configured to generate a probability of precipitation forecast.

FIG. 1 shows a system 100 configured to generate a probability of precipitation forecast. As shown in FIG. 1, the system 100 may include a processing system 110 and a storage system 120 communicatively coupled to the processing system 110. The system 100 may also include a communications interface 130 that is communicatively coupled to the processing system 110. The processing system 110, storage system 120, and/or communications interface 130 may obtain and/or store two or more forecasting algorithms, climatological and forecast data, spatial data (e.g., coordinates, areas, grid areas, or the like), and/or the like, about a region. Exemplary probability of precipitation forecasting algorithms include the QPF-based POP forecasting algorithm, the ensemble-based POP forecasting algorithm discussed above, although any suitable probability of precipitation forecasting algorithm may be employed.

The processing system 110 may be configured to perform calculations related to weather data. The processing system 110 may be comprised of a single processor, a plurality of processors in a single computer system, distributed secured processing resources, such as cloud computing, and/or the like. The processing system 110 may also include memory, databases, registers, or other means of storing data for processing. As shown in FIG. 1, the processing system 110 is communicatively coupled with the storage system 120 and the communications interface 130 via a communications system, which may be a computer bus, a secured communications network for distributed computing or cloud computing, or the like.

The processing system 110 may be configured to execute any suitable algorithm, routines, instructions, or the like. For example, the processing system 110 may be configured to execute forecasting algorithms, calibration routines for forecasting algorithms, forecast aggregation algorithms, or the like. The processing system 110 may be centralized, distributed, or a combination thereof. For example, the processing system 110 may include processing resources that are associated with a numerical weather prediction service that generates forecasts, processing resources that are associated with a climatological service that provides, for example, historical precipitation data, processing resources that are associated with a forecast aggregation service that aggregates POP forecast values, and/or processing resources to calibrate the forecasting algorithms provided by forecasting algorithm calibration service. The processing system 110 may include any suitable processing resources.

The storage system 120 may be any suitable storage system, including centralized, distributed, a combination thereof, or the like. For example, the storage system 120 may include a forecasting memory that is in computing resources associated with a numerical weather prediction service that generates forecasts, a climatological memory that is in computing resources associated with a climatological service that provides, for example, historical precipitation data, and a forecast aggregation memory associated with a forecast aggregation service that aggregates forecasted probability of precipitation forecast values for various spatiotemporal subregions. However, any suitable storage system 120 may be employed, such as the entire storage system 120 being associated with the forecast aggregation service and storing probability of precipitation forecasting algorithms.

The communications interface 130 is shown as being communicatively coupled with the processing system 110 and the storage system 120. The communications interface 130 may be a hardware or software interface that transmits, receives, and/or converts data to and/or from other systems, or the like. For example, the communications interface 130 may be a network interface that transmits and receives data in internet protocol format that includes encapsulated forecast data, climatological data, and/or any other suitable data, including algorithms, program codes, or the like. Other data may be transmitted and/or received. Additionally or alternatively, the communications interface 130 may be a software, virtual, or other non-hardware interface that is configured to transmit, receive, and/or convert data that includes encapsulated forecast data, climatological data, and/or any other suitable data, including algorithms, program codes, or the like. For example, the communications interface 130 may be configured to receive climatological data from a climatological data service and/or forecast data, such as probability of precipitation forecast data, from a forecast service. Additionally or alternatively, the communications interface 130 may be configured to receive forecasting algorithms, such as probability of precipitation forecasting algorithms from the forecasting service, or any other suitable service.

The processing system 110 may be configured to optimize a probability of precipitation forecast by uniquely associating a probability of precipitation forecast of two or more probability of precipitation forecast with a spatiotemporal subregion. The two or more forecasting algorithms may be associated with a region. For example, the two or more forecasting algorithms may be associated with a plains of the United States due to being well suited for the climate typically encountered in the plains. The region that is associated with the two or more forecasting algorithms may be subdivided into unique areas or spatial regions. The unique areas may have associated timeframes that are also unique. The term "unique" can mean non-overlapping. A unique timeframe and area of the two or more forecasting algorithms associated with the region can be referred to as a spatiotemporal subregion. Accordingly, the two or more forecasting algorithms associated with the region may be divided into a plurality of spatiotemporal subregions. As a result, the plurality of spatiotemporal subregions may be unique in that they may not temporally and spatially overlap.

As will be explained in more detail in the following, a spatiotemporal subregion of the plurality of spatiotemporal subregions may be uniquely associated, based on a data segment definition, with a forecasting algorithm of the two or more forecasting algorithms. An exemplary data segment definition may be "summertime date and an initial ensemble-based POP forecast value of less than 85%," although any suitable data segment definition may be employed. Furthermore, climatological data that meets the data segment definition may be selected, and the forecasting algorithm uniquely associated with the spatiotemporal subregion may be calibrated using the climatological data. The climatological data may be comprised of historical precipitation values, cloud coverage, humidity, or any data that can be used to optimize a probability of precipitation forecast.

A data segment definition may be comprised of a data segment definition parameter and corresponding values. The data segment definition parameters can include, without limitation, a precipitation rate threshold, a seasonal attribute, an area of the region associated with the two or more subregions, and/or the like. A precipitation threshold may be defined as equal to or greater than a precipitation threshold, probability of precipitation, a percentage of an area that experiences precipitation, etc. An exemplary seasonal attribute may be something that differentiates timeframes of a plurality of spatiotemporal subregions on a seasonal basis. For example, Mar. 13, 2021 from 0800 to 0900 hours may have a seasonal attribute of "spring", "early spring", "mid-March", etc. An area of a spatiotemporal subregion may be differentiated from other areas of the plurality of spatiotemporal subregions based on a geography, climatological characteristic, arbitrarily or politically defined boundaries, time zones, or any other suitable means. For example, the data segment definition may include "front range", "high plains", "upper mid plains", etc. Additionally or alternatively, the data segment definition may be "arid", "coastal", "temperate", etc.

As discussed above, each spatiotemporal subregion of the plurality of spatiotemporal subregions may have a unique timeframe and area. For example, a spatiotemporal subregion may have timeframes of every hour in an area of a predefined area. A predefined area may be defined by a gridded area. The term "gridded area" may mean an area that is uniquely identified by coordinates. The area may be square, triangular, hexagonal. The coordinates may be any suitable coordinates that can uniquely identify the area, such as longitude/latitude coordinates, global positioning (GPS) coordinates, etc., that have a positional relationship with the area. The areas of the spatiotemporal subregions may abut each other but may not overlap to ensure that, for example, global conservation laws of a model are conserved. As can be appreciated, temporally distinct spatiotemporal subregions may have the same or different areas. For example, a plurality of spatiotemporal subregions having distinct timeframes may have the same area, such as timeframes of a region about a particular airport (0700 to 0800 hours for airport A, 0800 to 0900 for airport A, etc.). The areas of each spatiotemporal subregion may be in units of square miles, although any suitable scale may be employed.

The term "probability of precipitation" may be defined, as an industry standard, as a probability of 0.01 inch of rain in a spatiotemporal subregion, although any suitable definition may be employed. For example, a probability of precipitation forecast may be 80 percent for the spatiotemporal subregion of 0800 to 0900 for airport A. This can mean that there is an 80 percent probability that the area of the spatiotemporal subregion will experience at least 0.01 inch of precipitation. The 0.01 inch of precipitation value is a threshold value. Accordingly, a probability of precipitation may be the same for 0.01 inch of precipitation or 5 inches of precipitation. However, a relatively low precipitation volume (e.g., "drizzle") may tend to occur in a set of conditions that are uniform over a larger portion of an area of a spatiotemporal subregion whereas higher precipitation volumes may occur in a set of conditions that are uniform over a smaller portion of the area of the same spatiotemporal subregion. Each probability of precipitation forecasting algorithm may be more well suited for a given probability of precipitation forecast value over another probability of precipitation forecast value. For example, as discussed above, a QPF-based POP forecasting algorithm may be more well suited for the higher probability of precipitation forecast values whereas the ensemble-based POP forecasting algorithm may be more suited for lower probability of precipitation forecast values.

QPF-based POP forecasting algorithm may determine a probability that a rain will be equal or exceed some threshold value. For example, a QPF-based POP forecast may have probabilities associated with threshold values of 0.10, 0.25, 0.50, and 1.00 inch. That is, a QPF-based POP forecast may be a probability of precipitation forecast value of 80 percent for 0.10 inches (i.e., an 80 percent probability that the precipitation will meet or exceed 0.10 inches), 70 percent for 0.20 inches, 40 percent for 0.30 inches, 20 percent for 0.40 inches, or 5 percent for 0.50 inches, or the like, although any suitable percentage resolution and units may be employed. For example, alternative percentage resolution may be every 5 percent and an alternative unit may be centimeters.

Ensemble-based POP forecasting algorithms may generate a probability of precipitation forecast based on a set of precipitation forecasts generated using a model where the inputs to the model are varied slightly. For example, each of the spatiotemporal subregions of 0700 to 0800 hours for airport A, 0800 to 0900 for airport A, etc., may have an ensemble-based POP forecast value determined from an ensemble of precipitation forecasts. By way of illustration, the spatiotemporal subregion of 0800 to 0900 for airport A may have associated POP forecast value that may be, for example, POP forecast values of 75%, 70%, and 65% based on the number of precipitation forecasts in that ensemble that indicate precipitation will occur.

These and other POP forecast values may be associated with each spatiotemporal subregion. Accordingly, the spatiotemporal subregion of 0800 to 0900 for airport A may have an associated ensemble-based POP forecast value and a QPF-based POP forecast value, and/or any other POP forecast values. As can be appreciated, the ensemble-based POP forecast values may be generated from an ensemble-based POP forecasting algorithm and the QPF-based POP forecast values may be generated from a QPF-based POP forecasting algorithm.

The POP forecast values associated with a spatiotemporal subregion may be initial POP forecast values. For example, the spatiotemporal subregion of 0800 to 0900 hours at airport A may have an initial ensemble-based POP forecast value that is generated by an initial ensemble-base POP forecasting algorithm that is not calibrated for the spatiotemporal subregion. Instead, the initial ensemble-based POP forecasting algorithm may have coefficients that are determined by calibrating the ensemble-based POP forecasting algorithm using all climatological data for the entire region. As is explained below in more detail, the initial POP forecast value, such as the initial ensemble-based POP forecast value may be used to select a probability of precipitation forecasting algorithm for calibration. The initial POP forecast value may be used in a data segment definition to select the probability of precipitation forecasting algorithm.

The forecast data associated with the spatiotemporal subregions may be differentiated by a data segment definition. By way of illustration, "summertime" may be a data segment definition value specifying data satisfying the data segment definition criterion of "a summertime date" and "an initial ensemble-based POP forecast value of less than 85%." Accordingly, forecast data meeting the data segment definition of summertime and an initial ensemble-based POP forecast value of less than 85% may be uniquely associated with the QPF-based POP forecasting algorithm. The forecast data of a spatiotemporal subregion may therefore be uniquely associated with one probability of precipitation forecasting algorithm.

The data segment definition may be based on meteorologists understanding that ensemble-based POP forecasting algorithm does not do a very good job with summertime thunderstorms, whereas the QPF-based POP forecasting algorithm does. Additionally or alternatively, the method 500 described below, or any other analytical means, may be employed. That is, the data segment definition's association with a particular probability of precipitation forecasting algorithm may be a predetermined association that is based on heuristics of meteorologists, statistical surveys, big data analysis, or any other suitable method.

The data segment definition may also be used to select climatological data. For example, the above data segment definition of "a summer date and an initial ensemble-based POP forecast value of <85%" may be used to select climatological data of a spatiotemporal subregion having a summertime date and a precipitation that corresponds to a POP forecast value of less than 85%. For example, climatological data associated with a spatiotemporal subregion may be selected if the spatiotemporal subregion is during the summer and precipitation occurred less than 85% of the time in the spatiotemporal subregion.

The selected climatological data may be used to calibrate the probability of precipitation forecasting algorithm that is associated with the POP forecast data that met the data segment definition. For example, the climatological data that met the data selection criteria of summertime and less than 85 percent precipitation may be used to calibrate a QPF-based POP forecasting algorithm. Accordingly, the calibrated QPF-based POP forecasting algorithm may be calibrated using climatological data that met a data segment definition. As a result, the calibrated probability of precipitation forecasting algorithm may accurately determine forecast data for spatiotemporal subregions that met the data segment definition.

As can be appreciated, the above describes using an initial ensemble-base POP forecasting algorithm for a spatiotemporal subregion to determine if the forecast data, which may be referred to as operational or real-time forecast data, of the spatiotemporal subregion should be determined or calculated by only the ensemble-based POP forecasting algorithm or only the QPF-based POP forecasting algorithm. In other words, as discussed above, the spatiotemporal subregion had an initial probability of precipitation forecast value. However, after calibration, the QPF-based POP forecasting algorithm may be used to determine an operational probability of precipitation forecast value for the spatiotemporal subregion to, for example, replace or supplement the initial probability of precipitation forecast value of the spatiotemporal subregion used to uniquely associate the spatiotemporal subregion to the QPF-based POP forecasting algorithm.

Figure 2:
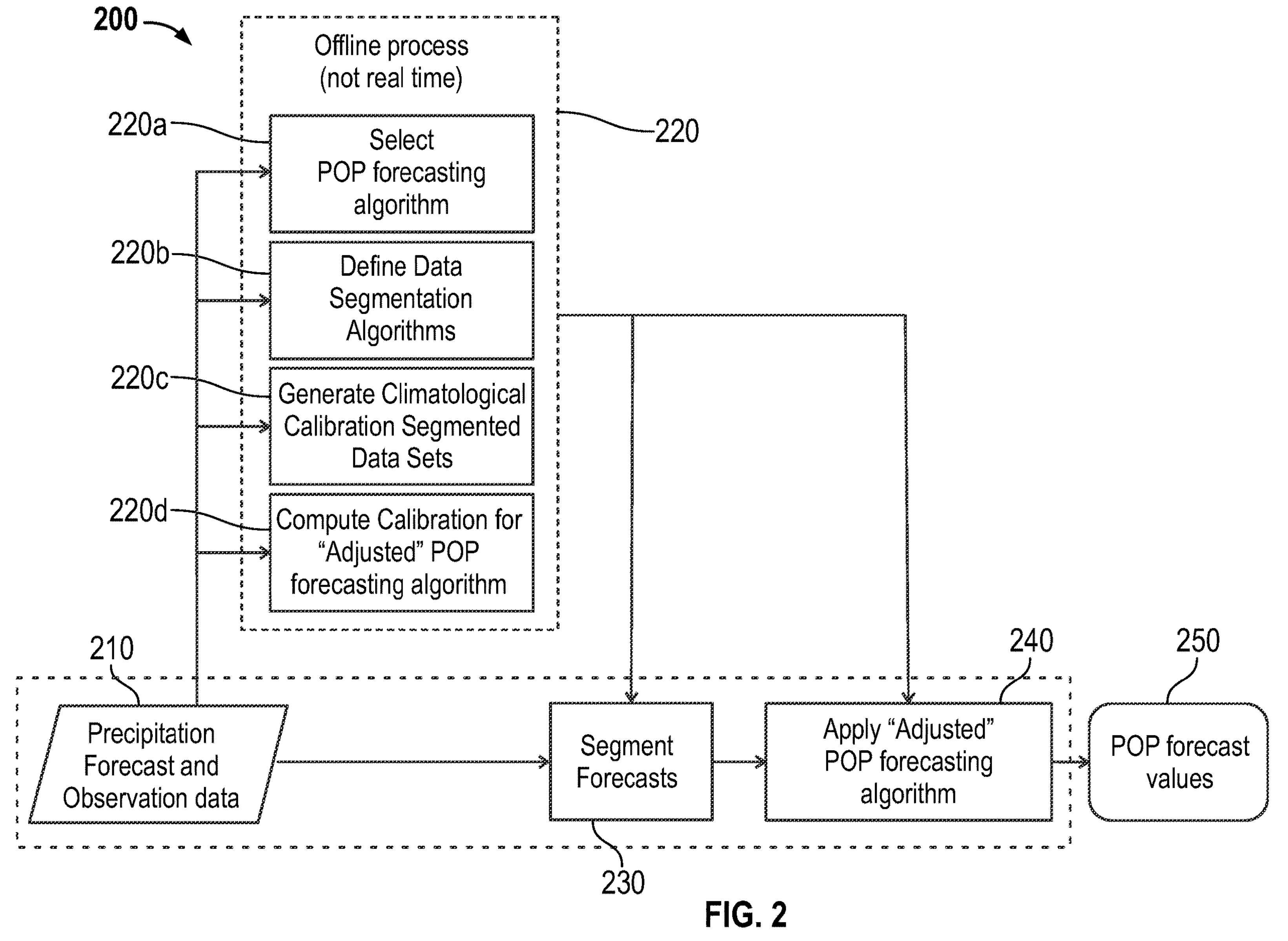
FIG. 2 shows a flowchart 200 for optimizing a probability of precipitation forecast.

FIG. 2 shows a flowchart 200 for optimizing a probability of precipitation forecast. The flowchart 200 shows a method for implementing an improved POP forecast system by combining multiple methods in a quantitatively justified and systematically calibrated manner. As shown in FIG. 2, the flowchart 200 includes a receiving precipitation forecast and observation data 210. The precipitation forecast may be comprised of initial probability of precipitation forecasts for a region. The observation data may be comprised of climatological data, such as, for example, historical precipitation data, as well as operational or real-time data for the region. The flowchart 200 includes an offline process 220 that received as an input the precipitation forecast and the observation data.

The offline process 220 includes selecting a probability of precipitation forecasting algorithm 220*a*. This may involve identifying and characterizing the initial probability of precipitation forecasting algorithms. For example, a system might include only the ensemble and QPF forecasting algorithms described above, and/or other algorithms. These probability of precipitation forecasting algorithms may be as they would be used in a typical and standalone manner, with any needed calibrations reflecting that usage. That is, the probability of precipitation forecasting algorithms may already be calibrated in a typical manner but not yet optimized by the system 100.

The offline process 220 also defines data segmentation algorithms 220*b*. This step may identify an algorithmic means for determining which particular spatiotemporal subregion (e.g., which location and which lead time) is to be associated with which probability of precipitation forecasting algorithm. For example, all summertime forecasts for which the initial ensemble-based POP forecast value is less than 85% may be associated with the ensemble-based POP forecasting algorithm and all other forecasts may be associated with the QPF-based POP forecasting algorithm. The algorithm for segmentation may be defined based on experience with strengths and weaknesses of each probability of precipitation forecasting algorithm, data analysis, such as big data analysis, machine learning, or the like.

The offline process 220 may generate climatological calibration segmented data sets 220*c*. For example, using the data segmentation methodology, the offline process 220 may apply this to the received climatological data. For example, a data set for the United States of America locations during winter 2018 may be appropriate. The data segmentation algorithm may divide that data set into separate, non-overlapping subsets of forecast events associated with each of the probability of precipitation forecasting algorithms.

The offline process 220 may also compute a calibration for adjusted probability of precipitation methodology 220*d*. This may involve computing calibration(s) for an "adjusted" POP forecasting algorithm using the climatological data set. As needed, calibration values for each of the POP forecasting algorithms are recomputed using its data subset. For example, the QPF-base POP forecasting algorithm would be calibrated by identifying the QPF thresholds associated with specified probability of precipitation forecast values (e.g., a QPF<1.0 mm forecast corresponds to observed rain 40% of the time and so the value of QPF<1.0 mm is assigned as the calibrated threshold for a POP=40% forecast). These calibration values for the "adjusted" version of the probability of precipitation forecasting algorithm are likely to differ from those for the corresponding "initial" version of the probability of precipitation forecasting algorithm.

The flowchart 200 is also shown as using the results of the offline process 220 to segment the forecasts 230. For each particular spatiotemporal subregion (e.g., each location and lead time), apply the data segmentation algorithm. The segment the forecasts 230 block identifies which "adjusted" POP-computation should be applied to that spatiotemporal subregion. The flowchart 200 also applies the associated adjusted POP forecasting algorithm 240 to the spatiotemporal subregion. For example, for each spatiotemporal subregion, apply the relevant "adjusted" probability of precipitation forecasting algorithm to compute a probability of precipitation forecast value 250.

Figure 3:
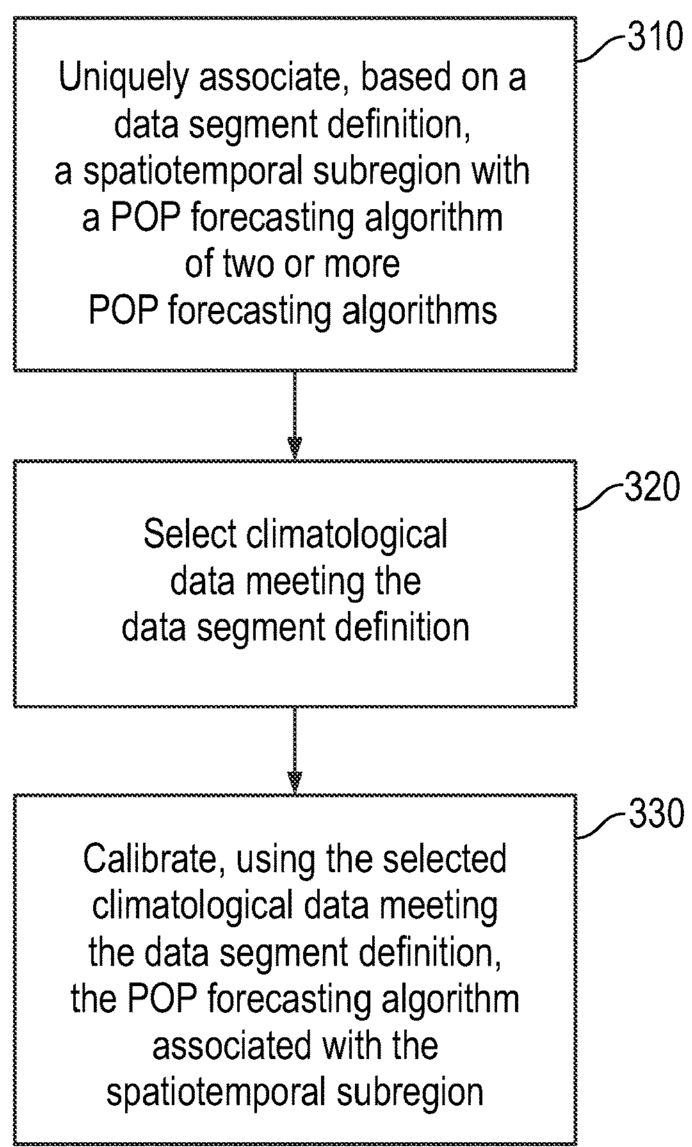
FIG. 3 shows a method 300 for optimizing a probability of precipitation forecast.

FIG. 3 shows a method 300 for optimizing a probability of precipitation forecast. As shown in FIG. 3, the method 300, in step 310, uniquely associates, based on a data segment definition, a spatiotemporal subregion with a probability of precipitation forecasting algorithm of two or more probability of precipitation forecasting algorithms. In step 320, the method 300 selects climatological data meeting the data segment definition. That is, the method 300 can select climatological data that meets the data segment definition used to uniquely associate the spatiotemporal subregion to the forecasting algorithm of the two or more forecasting algorithms. The method 300, in step 330 calibrates, using the selected climatological data meeting the data segment definition, the forecasting algorithm uniquely associated with the spatiotemporal subregion.

The step 310 of uniquely associating, based on a data segment definition, the spatiotemporal subregion with a probability of precipitation forecasting algorithm of two or more probability of precipitation forecasting algorithms can mean that the spatiotemporal subregion may subsequently have a forecasted probability of precipitation value that is determined using only one of the two or more probability of precipitation forecasting algorithms of a region. However, the step 310 of uniquely associating the probability of precipitation forecasting algorithm with the spatiotemporal subregion may include using an initial forecasted value. For example, the ensemble-based POP forecasting algorithm may determine an initial forecast probability of precipitation value for the spatiotemporal subregion. This initial forecast probability of precipitation value for the spatiotemporal subregion may be compared to the data segment definition to uniquely associate the QPF-based POP forecasting algorithm with the spatiotemporal subregion.

The step 320 of selecting the climatological data meeting the data segment definition may include comparing data segment definition to parameters of the climatological data. For example, the selected climatological data may be comprised of historical precipitation data for the spatial region of the spatiotemporal subregion that met a precipitation threshold and a seasonal attribute of the data segment definition. For example, historical precipitation data equivalent to the precipitation of less than 85% occurring during summertime may be selected to calibrate the selected probability of precipitation forecasting algorithm.

The step 330 of calibrating the probability of precipitation forecasting algorithm associated with the spatiotemporal subregion may include adjusting coefficients of the selected probability of precipitation forecasting algorithm until the inputs to the algorithm result in a forecast probability of precipitation value that is within a range of acceptable values. The selected and calibrated probability of precipitation forecasting algorithm is therefore associated with the spatiotemporal subregion and may be the only probability of precipitation forecasting algorithm used to calculate a probability of precipitation forecast value for the spatiotemporal subregion.

The method 300 may comprise additional steps, such as the steps of method 500. For example, the method 500 described with reference to FIG. 5 may be performed prior to the method 300 to determine which combination of the probability of precipitation forecasting algorithms and the data segment definition is optimal. Accordingly, as will be described in more detail in the following, determining the optimal combination of the probability of precipitation forecasting algorithm and the data segment definition may be automated.

A successful probability of precipitation forecasting algorithm is generally assessed using two criteria. The first criteria may be reliability. Under the reliability criteria, a forecast of (for example) 30% precipitation chance should correspond to precipitation that actually occurs for 30% of such events. This metric may be assessed using a reliability diagram. In the reliability diagram, an abscissa axis may be a forecast probability of 0 to 1 and an ordinate axis may be observed frequency of 0 to 1. A perfectly reliable POP forecasting algorithm may have a straight line (e.g., diagonal) extending from coordinates (0, 0) and (1, 1).

The second criteria may be skill. Under the skill criteria, a probability of precipitation forecasting algorithm should be able to distinguish a probability of precipitation forecast value from its climatological average. For example, in an area where rain occurs 5% of the time, a probability of precipitation forecasting algorithm that always says the probability of precipitation forecast value is 5% has no skill. A skillful probability of precipitation forecasting algorithm is one that had predicted, for example, a probability of precipitation forecast value of <10% when precipitation did not occur or a probability of precipitation of 50+% when precipitation did occur. This metric may be assessed using a Receiver Operating Characteristics (ROC) or similar diagram, although any suitable means may be employed.

This system may achieve both high reliability and good skill by emphasizing the strengths of each probability of precipitation methodology and limiting its weaknesses. For example, uniquely associating a probability of precipitation forecasting algorithm for a spatiotemporal subregion based on a data segment definition (e.g., initial POP forecast value threshold and/or seasonal attribute) may ensure that the probability of precipitation forecasting algorithm is the most skillful and/or reliable of the probability of precipitation forecasting algorithms associated with a region. In addition, calibrating the associated probability of precipitation forecasting algorithm using climatological data meeting the same data segment definition can further assure that the probability of precipitation forecasting algorithm to the spatiotemporal subregion can ensure that the calibrated probability of precipitation forecasting algorithm is optimally skillful and reliable. Accordingly, the system performance can be evaluated using reliability and skill metrics.

An important aspect of precipitation forecasting may be normalization. For example, predicted precipitation amounts should statistically match observed precipitation amounts, when averaged over many forecast events. By segmenting forecasts (e.g., initial POP forecast values/spatiotemporal subregions meeting a data segment definition) and associating only one or uniquely associating a probability of precipitation forecasting algorithm to each spatiotemporal subregion and calibrating the uniquely associated probability of precipitation forecasting algorithm using only climatological data that meet the data segment definition, any normalization achieved for the underlying forecasts may be preserved for the system.

FIG. 4 shows a data segment definition 400 for optimizing a probability of precipitation forecast. As shown in FIG. 4, data segment definition 400 includes a plurality of data segment definition parameters 410 and a corresponding plurality of data segment definition values 420. Although four data segment definition parameters and corresponding data segment definition values are shown, more or fewer data segment definition parameters and data segment definition values may be employed. For example, a data segment definition may employ only the precipitation threshold and the seasonal attribute. Although the data segment definition 400 is depicted in relational form or a table, any suitable data structure may be employed to maintain the associations between the data segment definition parameters 410 and the corresponding data segment definition values 420.

As shown, the plurality of data segment definition parameters 410 include a "precipitation threshold" and "seasonal attribute." The plurality of data segment definition parameters 410 also includes "third DSD parameter" and "fourth DSD parameter", where "DSD" is an acronym for "data segment definition." The third DSD parameter and the fourth DSD parameter may be additional data segment definition parameters that comprise the data segment definition 400. For example, the third DSD parameter may be "cloud coverage" and the fourth DSD parameter may be "humidity", although any suitable data segment definition parameters may be employed.

Also as shown in FIG. 4, the plurality of data segment definition values 420 includes "less than 85%" and "summertime." Other additional and/or alternative data segment values may be employed. For example, alternative data segment definition values may include "wintertime" for the "seasonal attribute" data segment definition parameter and "greater than 85%" for the "precipitation threshold" data segment definition parameter. For other data segment definition parameters, other data segment definition values may be employed. For example, for a data segment definition parameter of "cloud coverage", the data segment definition value may be "greater than 20%".

The plurality of data segment definition values 420 also includes "third DSD value" and "fourth DSD value." The third DSD value and the fourth DSD value may be additional data segment definition values that respectively correspond to the third DSD parameter and the fourth DSD parameter. For example, where the third DSD parameter is "cloud coverage" and the fourth DSD parameter is "humidity", the third DSD value may be "less than 30%" and the fourth DSD value may be "greater than 40%", although any suitable data segment definition values may be employed.

Accordingly, the "less than 85%" is a value that corresponds to the precipitation threshold parameter, the "summertime" is a value that corresponds to "seasonable attribute" parameter, the third DSD value is a value that corresponds to the third DSD parameter, and the fourth DSD value is a value that corresponds to the fourth DSD parameter. Additionally or alternatively, other data segment definition parameter values 410 may be employed for corresponding data segment definition parameters 410.

Figure 5:
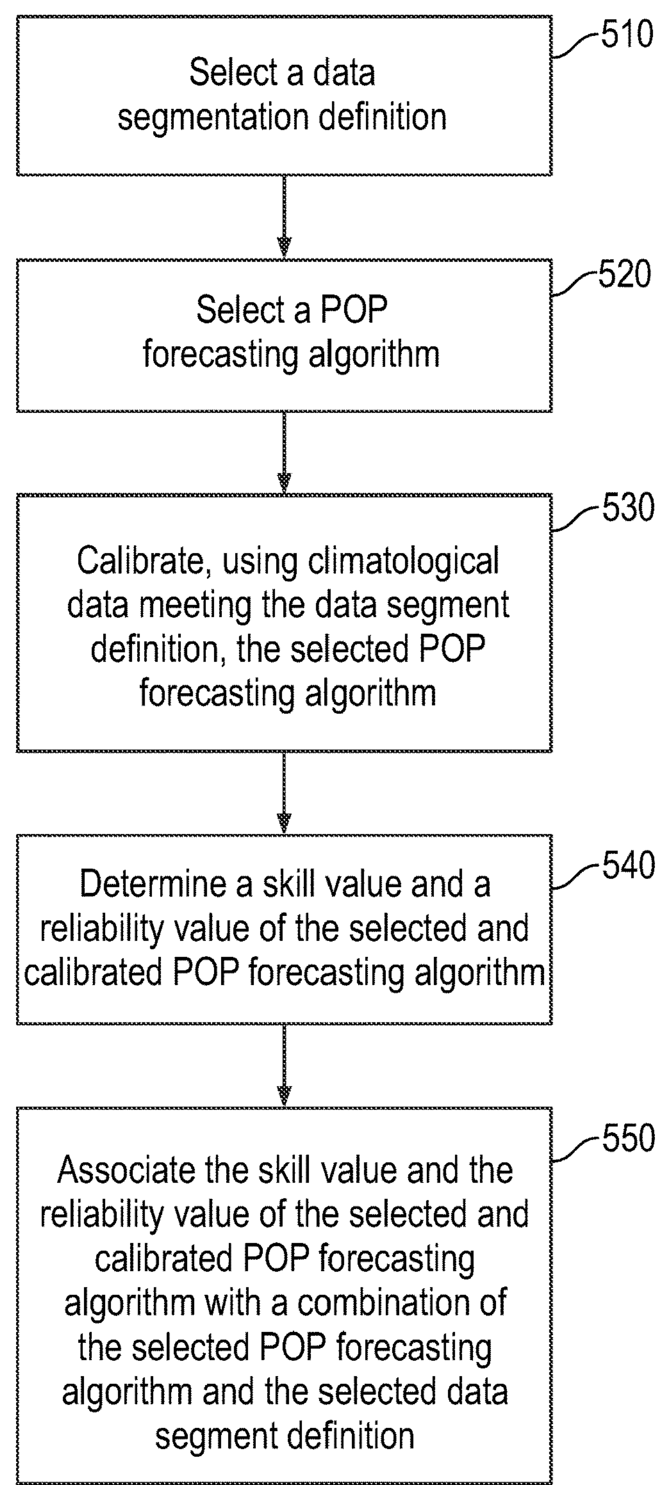
FIG. 5 shows a method 500 for optimizing a probability of precipitation forecast.

FIG. 5 shows a method 500 for optimizing a probability of precipitation forecast. As shown in FIG. 5, the method 500 begins by selecting a data segment definition in step 510. In step 520, the method 500 selects a probability of precipitation forecasting algorithm. In step 530, the method 500 calibrates, using climatological data meeting the data segment definition, the probability of precipitation forecasting algorithm. The method 500, in step 540, evaluates a skill and reliability of the selected and calibrated forecasting algorithm. In step 550, the method 500 associates the skill and the reliability of the selected and calibrated probability of precipitation forecasting algorithm, the selected probability of precipitation forecasting algorithm, and the selected data segment definition.

The method 500 may select any suitable data segment definition in step 510. For example, the method 500 may select a data segment definition that includes a precipitation threshold parameter and a corresponding precipitation threshold value and a seasonal attribute parameter and a corresponding seasonal attribute value, although more, fewer, additional, and/or alternative data segment definition parameters and corresponding data segment definition values may be employed. An exemplary data segment definition may include the "less than 85%" and "summertime" data segment definition values discussed above, although other data segment definition parameters and/or data segment definition values may be employed.

The selection of the data segment definition may be random, based on a sorting algorithm, or any other suitable means. For example, a data segment definition selection algorithm may organize the data segment definition parameters in an ascending order of, for example, perceived contribution to an optimization of a probability of precipitation forecasting algorithm. For example, referring to FIG. 4, the precipitation threshold parameter may be perceived as having a greater contribution than the seasonal attribute parameter, the Third DSD parameter, and the Fourth DSD parameter to the optimization of the probability of precipitation forecasting algorithms for a region. However, any suitable ordering, including random, may be employed.

The data segment definition selection algorithm may also select unique combinations or sets of the data segment definition parameters. For example, the data segment definition selection algorithm may select the precipitation threshold parameter and the seasonal attribute parameter to comprise a data segment definition. Accordingly, the selected data segment definition may consist of, in this particular example, the precipitation threshold parameter and the seasonal attribute parameter, although any suitable combination of data segment definition parameters may be employed in other examples. An iterative process can perform an evaluation of all possible combinations of data segment definition parameters.

By way of illustration, in a first iteration of a set of data segment definition parameters, the method 500 may select only "precipitation threshold" and "seasonal attribute" for evaluation. In a second iteration of a set of data segment definition parameters, the method 500 may select "precipitation threshold", "seasonal attribute", and "Third DSD parameter". In a third iteration of a set of data segment definition parameters, the method 500 may select "precipitation threshold", "seasonal attribute, and "Fourth DSD parameter". Each set of data segment definition parameters can be iteratively evaluated using all possible combinations of data segment definition values.

Each data segment definition parameter may have a corresponding list of possible data segment definition values that can be selected for a particular data segment definition. For example, the precipitation threshold discussed above with reference to FIG. 4 may have an associated list of values comprising "less than 85%" and "greater than 85%" Accordingly, the data segment definition selection algorithm could iteratively select from the list of values associated with the particular precipitation threshold parameter.

By way of illustration, the data segment definition selection algorithm may, for a first iteration, select a precipitation threshold value of "less than 85%" and seasonal attribute value of "summertime." In a second iteration, the data segment definition selection algorithm may select a precipitation threshold value of "greater than 85%" and a seasonal attribute value of "summertime". This iterative process can continue until all of the possible combinations the data segment definition values are selected for a set of data segment definition parameters.

The method 500, in step 520, may select a probability of precipitation forecasting algorithm. The probability of precipitation forecasting algorithm can include the QPF-based POP forecasting algorithm, the ensemble-based POP forecasting algorithm, and/or any other suitable forecasting algorithm. The probability of precipitation forecasting algorithm may be selected randomly, based on an ascending order based on heuristics, or any other suitable criteria. For example, the ensemble-based POP forecasting algorithm may be selected first because it may be known as an optimal probability of precipitation forecasting algorithm for most precipitation thresholds and/or seasonal attributes. Accordingly, computing resources may be minimized by, for example, ranking the probability of precipitation forecast by most likely to be optimal of all of the probability of precipitation forecasting algorithms for a region for most of the possible data segment definitions.

The selected probability of precipitation forecasting algorithm may have initial coefficients with values that are adjusted to different values during calibration. The initial coefficients may be the result of a general calibration that ensures the selected probability of precipitation forecasting algorithm is able to meet a minimal standard of reliability and skill for all precipitation thresholds, seasonal attributes, and/or the like, of a region. That is, the selected probability of precipitation forecasting algorithm may be an initial probability of precipitation forecasting algorithm that is suitable, but not optimal, for all possible combinations of data segment definition parameters and/or data segment definition values for a region.

In step 530, the method 500 may calibrate, using climatological data that meets the selected data segment definition, the selected probability of precipitation forecasting algorithm. The calibration of the selected probability of precipitation forecasting algorithm may be the same or similar to the calibration of a probability of precipitation forecasting algorithm described above with reference to FIG. 3, although any suitable calibration may be employed.

It may be advantageous to ensure that the calibration algorithm of method 300 is the same as the calibration algorithm of method 500.

In step 540, the method 500 may evaluate a skill and a reliability of the selected and calibrated probability of precipitation forecast. The skill of the selected and calibrated probability of precipitation forecasting algorithm may be evaluated by determining if a forecasted probability of precipitation for a spatiotemporal subregion is different than a climatological average corresponding to the spatiotemporal subregion. For example, the selected and calibrated probability of precipitation forecasting algorithm may have a relative operating characteristic curve that is very divergent from a climatological average line, which indicates that the selected and calibrated probability of precipitation rate forecasting algorithm has good skill. The reliability of the selected and calibrated probability of precipitation forecasting algorithm may also be evaluated. For example, a reliability diagram may be employed to determine whether the selected and calibrated probability of precipitation forecasting algorithm is reliable.

The evaluation may simply calculate a skill value, a reliability value, and/or other values useful in evaluating the selected and calibrated probability of precipitation forecasting algorithm. Additionally or alternatively, the evaluation may aggregate the skill, reliability, and/or other evaluation values. For example, the skill, reliability and/or other evaluation values may be weighted as a percentage of an aggregated evaluation value.

These and other values may be used in an association in step 550. For example, the method 500 may associate a skill value and a reliability value determined when evaluating the selected and calibrated probability of precipitation forecasting algorithm with the selected probability of precipitation forecasting algorithm and the selected data segment definition. By way of illustration, a QPF-based POP forecasting algorithm may be selected and calibrated using climatological data and then evaluated to determine a corresponding skill value and reliability value. The climatological data used to calibrate the QPF-based POP forecasting algorithm may be selected based on a selected data segment definition that only includes a precipitation threshold value of "less than 85%" and a seasonal attribute of "summertime". Accordingly, the skill, reliability, and/or other evaluation values resulting from the evaluation may be associated with the QPF-based POP forecasting algorithm having initial values and calibrated using climatological data meeting the data segment definition of the precipitation threshold value of "less than 85%" and the seasonal attribute of "summertime."

The method 500 may be part of an iterative routine in which all possible combinations of data segment definitions and probability of precipitation forecasting algorithms are selected, calibrated, and evaluated. Accordingly, each combination of a data segment definition and a probability of precipitation forecasting algorithm may be associated with an evaluation value or values, such as a skill, reliability, and/or other evaluation values, as is discussed in more detail in the following with reference to FIG. 6.

FIG. 6 shows a table 600 of associations between a skill and a reliability of the selected and calibrated probability of forecasting algorithm and a combination of the selected probability of precipitation forecasting algorithm and the selected data segment definition. As shown in FIG. 6, the table 600 includes rows of associations 610. Each row associates a probability of precipitation forecasting algorithm-to-data segment definition combination to a skill and a reliability. The table 600 includes columns 620 comprised of a probability of precipitation forecasting algorithm column 620*a*, a data segment definition column 620*b*, a skill value column 620*c*, and a reliability value column 620*d*. Additionally or alternatively, other columns and/or rows may be employed.

Although the table 600 is depicted in relational form, any suitable data structure may be employed to maintain the associations between a skill and a reliability of the selected and calibrated probability of precipitation forecasting algorithm and the combination of the selected probability of precipitation forecasting algorithm and the selected data segment definition. For example, a coordinate of a skill value and a reliability value may be tagged with or referenced to the associated combination of the selected probability of precipitation forecasting algorithm and the selected data segment definition. Accordingly, the table 600 is an exemplary representation of a data structure that maintains the associations between skill values and reliability values of the selected and calibrated probability of precipitation forecasting algorithm and combinations of the selected probability of precipitation forecasting algorithms and the selected data segment definitions.

As shown in FIG. 6, the probability of precipitation forecasting algorithm column 620*a* shows a QPF-based POP forecasting algorithm (abbreviated as "QPF-based FA"), an ensemble-based POP forecasting algorithm (abbreviated as "ensemble-based FA"), and a third probability of precipitation forecasting algorithm (abbreviated as "POPFA3"), although any suitable list of probability of precipitation forecasting algorithms may be employed.

The data segment definition column 620*b* includes a "first data segment definition", a "second data segment definition", and a "third data segment definition", although any suitable list of data segment definitions may be employed. By way of illustration, the first data segment definition may consist of precipitation threshold value of "less than 85%" and a seasonal attribute value of "summertime" and the second data segment definition may consist of precipitation threshold value of "greater than 85%" and a seasonal attribute value of "summertime".

The skill value column 620*c* and the reliability value column 620*d* are respectively comprised of a first through eighth skill value and a first through eighth reliability value, each of which is the result of an evaluation of the corresponding combination of the probability of precipitation forecasting algorithm in the probability of precipitation forecasting algorithm column 620*a* and the data segment definition in the data segment definition column 620*b*. For example, the first skill value and the first reliability value are associated with the combination of the QPF-based POP forecasting algorithm and the first data segment definition. Additionally or alternatively, the columns 620 may include an aggregated value of the skill, reliability, and/or other evaluation value that are associated with the combination of a particular combination of a probability of precipitation forecasting algorithm and a data segment definition.

As can be appreciated, each data segment definition, such as the first data segment definition, may correspond to, for example, three probability of precipitation forecasting algorithms. This is due to the method 500 being part of an interactive procedure that evaluates a particular data segment definition with all possible probability of precipitation forecasting algorithms. As can also be appreciated, the skill and reliability values in the skill value column 620*c* and the reliability value column 620*d* may be used to determine which combination of a probability of precipitation forecasting algorithm and data segment definition is optimal. For example, if the first skill value and the first reliability value are respectively greater than the second and third skill values and the second and third reliability values, then the combination of the QPF-based POP forecasting algorithm and the first data segment definition is optimal. Accordingly, the table 600, or other tables for optimizing a probability of precipitation forecast may be employed by method 300.

For example, the method 300 may uniquely associate, based on a data segment definition, a spatiotemporal subregion with a probability of precipitation forecasting algorithm of two or more probability of precipitation forecasting algorithms by cross referencing the data segment definition of method 300 to the data segment definition column 620*b* in table 600, determining which combination of the probability of precipitation forecasting algorithm and the data segment definition has the optimal evaluation value or values, and selecting the corresponding probability of precipitation forecasting algorithm from the probability of precipitation forecasting algorithm column 620*a*. For example, if the data segment definition of the method 300 is the first data segment definition and the QPF-based POP forecasting algorithm is optimal for the first data segment definition, then the method 300 can uniquely associate the spatiotemporal subregion meeting the first data segment definition with the QPF-base forecasting algorithm.

Accordingly, the system 100 may optimize a probability of precipitation forecast by performing the method 300 and/or the method 500. For example, the system 100 may include a storage system 120 configured to store two or more probability of precipitation forecasting algorithms for a region including a spatiotemporal subregion and a data segment definition. The system 100 may also include a processing system 110 communicatively coupled to the storage system 120, where the processing system 110 is configured to perform the steps of method 300 and/or method 500.

For example, the storage system 120 may be configured to store two or more probability of precipitation forecasting algorithms for a region including a spatiotemporal subregion and a data segment definition. The processing system 110 may be configured to uniquely associate, based on a data segment definition, a spatiotemporal subregion with a probability of precipitation forecasting algorithm of two or more probability of precipitation forecasting algorithms. The processing system 110 may also be configured to select climatological data meeting the data segment definition and calibrate, using the selected climatological data meeting the data segment definition, the probability of precipitation forecasting algorithm associated with the spatiotemporal subregion.

The two or more probability of precipitation forecasting algorithm may be associated with a region including the spatiotemporal subregion. For example, the two or more probability of precipitation forecasting algorithms may have been preselected as being suitable for the region including the spatiotemporal subregion. The probability of precipitation forecasting algorithms may be preselected based on heuristics or general knowledge as being suitable for forecasting precipitations for the region.

The processing system 110 being configure to uniquely associate, based on a data segment definition, the spatiotemporal subregion with the probability of precipitation forecasting algorithm may comprise determining if an initial probability of precipitation forecast value from one of the two or more probability of precipitation forecasting algorithms meets the data segment definition.

The selected climatological data may comprise one or more historical precipitation values associated with a spatial region of the spatiotemporal subregion. For example, with reference to the foregoing examples, the airport A may be a spatial region of the spatiotemporal subregions of 0700 to 0800 hours for airport A, 0800 to 0900 hours for airport A, etc. In this example, the selected climatological data may be for the airport A that also meet the seasonal attribute of "summertime." That is, the one or more historical precipitation values associated with the spatial region of the spatiotemporal subregion and the seasonal attribute of the historical precipitation data may meet the data segment definition.

In the examples above, the data segment definition comprises at least a precipitation threshold and a seasonal attribute. Requiring that the data segment definition include at least a precipitation threshold and a seasonal attribute may allow any analysis to less computationally intensive. By way of illustration, an initial assumption in a big data analysis may be that all optimal probability of precipitation forecasting algorithms will necessarily be selected using a data segment definition that includes at least the precipitation threshold and the seasonal attribute. Accordingly, when this assumption is made, the most optimal data segment definition obtained from big data analysis may or may not include data segment definition parameters additional to the precipitation threshold and the seasonal attribute.

The processing system 110 may be further configured to use the calibrated probability of precipitation forecasting algorithm to generate a probability of precipitation forecast for the spatiotemporal subregion and provide the probability of precipitation forecast. For example, the processing system 110 may be configured to not only determine an optimal probability of precipitation forecasting algorithm for the spatiotemporal subregion but may also be further configured to generate the probability of precipitation forecast value and provide the probability of precipitation forecast value to a consumer via the communications interface 130.

Additionally or alternatively, the processing system 110 may be configured to select a data segment definition and select a probability of precipitation forecasting algorithm. The data segment definition and/or the probability of precipitation may be selected from the storage system 120, although any suitable storage system may be employed, including storage system external to the system 100 that are communicatively coupled to the communications interface 130.

The processing system 110 may also be configured to calibrate, using climatological data meeting the data segment definition, the probability of precipitation forecasting algorithm, as described above. The processing system 110 may be further configured to determine a skill value and a reliability value of the selected and calibrated probability of precipitation forecasting algorithm. For example, the processing system 110 may be configured to automatically perform a reliability and receiver operating characteristic analysis on the selected and calibrated probability of precipitation forecasting algorithm.

The processing system 110 may also be configured to associate the skill value and reliability value of the selected and calibrated probability of precipitation forecasting algorithm with a combination of the selected probability of precipitation forecasting algorithm and the selected data segment definition. The processing system 110 may be further configured to iteratively perform the above steps to respectively associate the skill values and the reliability values of a plurality of the selected and calibrated probability of precipitation forecasting algorithms with a plurality of the combinations of the selected probability of precipitation forecasting algorithm and the selected data segment definition.

The associations discussed above may be maintained as described above with reference to, for example, FIG. 6, although any suitable means of maintaining the associations may be employed. For example, the processing system 110 may be configured to write to a database stored in the storage system 120, although any suitable storage system, including those external to the system 100 that are communicatively coupled to the communications interface 130 may be employed.

The processing system 110 may be further configured to determine, based on the skill and the reliability of the selected and calibrated probability of precipitation forecasting algorithm, an optimized combination of the selected probability of precipitation forecasting algorithm and the data segment definition. For example, the processing system 110 may, for a given data segment definition, determine which combination of the selected probability of precipitation forecasting algorithm and the data segment definition had greater reliability and/or skill.

Additionally or alternatively, the processing system 110 may be configured to associate an aggregation of the skill value and the reliability value with the combination of the selected probability of precipitation forecasting algorithm and the selected data segment definition. The processing system 110 may, for example, add a reliability value and a skill value together for all of the combinations of the selected probability of precipitation forecasting algorithm and the data segment definition and determine which is the greatest. Additionally or alternatively, the reliability value and the skill value may be weighted. For example, each of the skill value and the reliability value may be weighted as a percentage of one. The processing system 110 may be further configured to store the association between the skill value and the reliability value of the selected and calibrated probability of precipitation forecasting algorithm and the combination of the selected probability of precipitation forecasting algorithm and the data segment definition.

The system 100, flowchart 200, and/or method 300 may optimize a probability of precipitation forecast. For example, a well-performing system 100 may achieve appropriate transitions at boundaries between spatiotemporal subregions for which different probability of precipitation forecasting algorithms apply. By way of illustration, precipitation may be spatially discontinuous, so discontinuities themselves may not inherently problematic. A data segmentation algorithm that uses a data segment definition may ensure desirable boundary performance for selected probability of precipitation forecasting algorithms.

Also, the system 100 and/or method 500 can ensure that the most optimal probability of precipitation forecasting algorithm being selected. For example, by evaluating the skill and reliability of two or more probability of precipitation forecasting algorithm for a data segment definition, the most optimal probability of precipitation forecasting algorithm may be selected for the data segment definition.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined, in whole or in part, to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems and methods for optimizing probability of precipitation forecast and not just to the embodiments described above and shown in the accompanying figures. Accordingly, the scope of the embodiments described above should be determined from the following claims.

We claim:

1. A method comprising:

uniquely associating, based on a data segment definition, a spatiotemporal subregion with a precipitation forecasting algorithm of two or more precipitation forecasting algorithms;

selecting climatological data meeting the data segment definition; and calibrating, using the climatological data meeting the data segment definition, the precipitation forecasting algorithm associated with the spatiotemporal subregion to generate a calibrated precipitation forecasting algorithm.

2. The method of claim 1, wherein the two or more precipitation forecasting algorithms are associated with a region including the spatiotemporal subregion.

3. The method of claim 2, wherein uniquely associating, based on the data segment definition, the spatiotemporal subregion with the precipitation forecasting algorithm comprises determining if an initial precipitation forecast value from one of the two or more precipitation forecasting algorithms meets the data segment definition.

4. The method of claim 1, wherein the climatological data comprises one or more historical precipitation values associated with a spatial region of the spatiotemporal subregion.

5. The method of claim 4, wherein the one or more historical precipitation values associated with the spatial region of the spatiotemporal subregion and a seasonal attribute of the climatological data meet the data segment definition.

6. The method of claim 1, wherein the data segment definition comprises at least a precipitation threshold and a seasonal attribute.

7. The method of claim 1, further comprising using the calibrated precipitation forecasting algorithm to generate a precipitation forecast value for the spatiotemporal subregion.

8. A system comprising:

a storage system with instructions configured to:

uniquely associate, based on a data segment definition, a spatiotemporal subregion with a precipitation forecasting algorithm of two or more precipitation forecasting algorithms;

select climatological data meeting the data segment definition; and calibrate, using the climatological data meeting the data segment definition, the precipitation forecasting algorithm associated with the spatiotemporal subregion to generate a calibrated precipitation forecasting algorithm; and a processing system communicatively coupled to the storage system.

9. The system of claim 8, wherein the two or more precipitation forecasting algorithms are associated with a region including the spatiotemporal subregion.

10. The system of claim 8, wherein uniquely associating, based on the data segment definition, the spatiotemporal subregion with the precipitation forecasting algorithm comprises determining if an initial precipitation forecast value from one of the two or more precipitation forecasting algorithms meets the data segment definition.

11. The system of claim 8, wherein the climatological data comprises one or more historical precipitation values associated with a spatial region of the spatiotemporal subregion.

12. The system of claim 11, wherein the one or more historical precipitation values and a seasonal attribute of the climatological data meet the data segment definition.

13. The system of claim 8, wherein the data segment definition comprises at least a precipitation threshold and a seasonal attribute.

14. The system of claim 8, wherein the processing system is further configured to: use the calibrated precipitation forecasting algorithm to generate a precipitation forecast value for the spatiotemporal subregion and provide the precipitation forecast value.

15. A method comprising:

selecting a data segment definition;

selecting a precipitation forecasting algorithm;

calibrating, using climatological data meeting the data segment definition, the precipitation forecasting algorithm to generate a calibrated precipitation forecasting algorithm;

determining a skill value and a reliability value of the calibrated precipitation forecasting algorithm; and associating the skill value and the reliability value of the calibrated precipitation forecasting algorithm with a combination of the precipitation forecasting algorithm and the data segment definition.

16. The method of claim 15, further comprising determining, based on the skill value and the reliability value of the calibrated precipitation forecasting algorithm, an optimized combination of the precipitation forecasting algorithm and the data segment definition.

17. The method of claim 15, further comprising storing an association between the skill value and the reliability value of the calibrated precipitation forecasting algorithm and the combination of the precipitation forecasting algorithm and the data segment definition.

18. The method of claim 15, wherein associating the skill value and the reliability value with the combination of the precipitation forecasting algorithm and the data segment definition comprises associating an aggregation of the skill value and the reliability value with the combination of the precipitation forecasting algorithm and the data segment definition.

19. A system comprising:

a storage system with instructions configured to:

select a data segment definition;

select a precipitation forecasting algorithm from two or more precipitation forecasting algorithms;

calibrate, using climatological data meeting the data segment definition, the precipitation forecasting algorithm to generate a calibrated precipitation forecasting algorithm;

determine a skill value and a reliability value of the calibrated precipitation forecasting algorithm; and associate the skill value and the reliability value of the calibrated precipitation forecasting algorithm with a combination of the precipitation forecasting algorithm and the data segment definition; and a processing system communicatively coupled to the storage system.

20. The system of claim 19, further comprising determining, based on the skill value and the reliability value of the calibrated precipitation forecasting algorithm, an optimized combination of the precipitation forecasting algorithm and the data segment definition.

21. The system of claim 19, further comprising storing an association between the skill value and the reliability value of the calibrated precipitation forecasting algorithm and the combination of the precipitation forecasting algorithm and the data segment definition.

22. The system of claim 19, wherein associating the skill value and the reliability value with the combination of the precipitation forecasting algorithm and the data segment definition comprises associating an aggregation of the skill value and the reliability value with the combination of the precipitation forecasting algorithm and the data segment definition.

* * * * *